(12) United States Patent
Janoff et al.

(10) Patent No.: US 6,415,868 B1
(45) Date of Patent: Jul. 9, 2002

(54) METHOD AND APPARATUS FOR PREVENTING THE FORMATION OF ALKANE HYDRATES IN SUBSEA EQUIPMENT

(75) Inventors: Dwight D. Janoff, Missouri City; John C. Vicic, Spring, both of TX (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/644,422

(22) Filed: Aug. 23, 2000

(51) Int. Cl.⁷ .................................................. F16L 9/22
(52) U.S. Cl. ........................ 166/368; 166/57; 138/149
(58) Field of Search ........................ 138/149; 166/335, 166/367, 368, 57

(56) References Cited

U.S. PATENT DOCUMENTS

| 3,643,736 A | | 2/1972 | Talley, Jr. | |
|---|---|---|---|---|
| 6,000,438 A | * | 12/1999 | Ohrn | ........................ 138/149 |
| 6,116,290 A | * | 9/2000 | Ohrn et al. | ................. 138/149 |

FOREIGN PATENT DOCUMENTS

WO    WO 00/40886 A1    7/2000

* cited by examiner

*Primary Examiner*—William Neuder
(74) *Attorney, Agent, or Firm*—Henry C. Query, Jr.

(57) ABSTRACT

The present invention embodies a temperature control device for preventing the formation of alkane hydrates in a subsea oil and gas production equipment component having at least one flow path through which a well fluid is permitted to flow, the well fluid having a flow temperature and a lower hydrate formation temperature at which hydrates will form in the well fluid, the temperature control device comprising a housing positioned in heat exchange relation with respect to the flow path and a phase change material disposed in the housing, the phase change material having a melting point which is below the flow temperature but above the hydrate formation temperature, whereby when the temperature of the phase change material drops to its melting point, the phase change material will solidify and its latent heat will be transferred to the well fluid to maintain the temperature of the well fluid in the flow path above its hydrate formation temperature.

10 Claims, 2 Drawing Sheets

FIG. 1
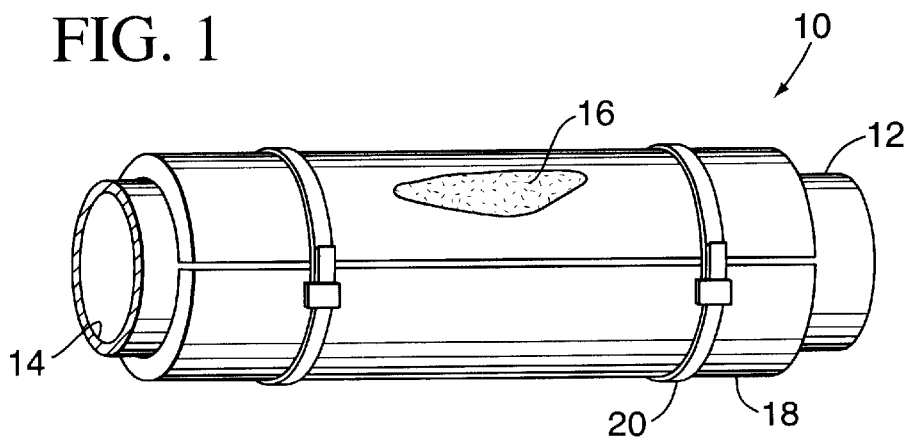
FIG. 2
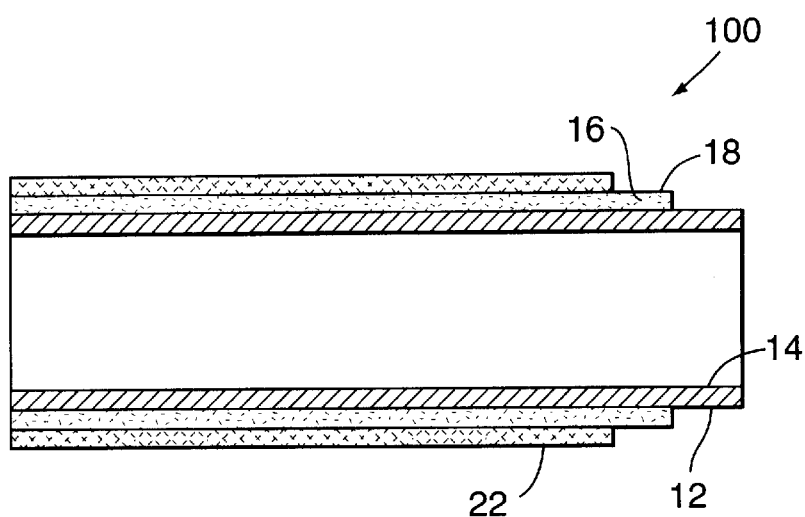
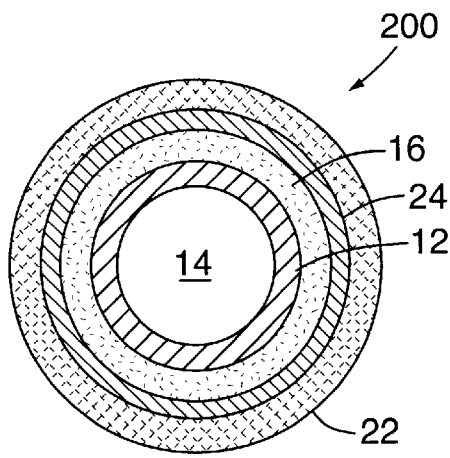
FIG. 3

METHOD AND APPARATUS FOR PREVENTING THE FORMATION OF ALKANE HYDRATES IN SUBSEA EQUIPMENT

BACKGROUND OF THE INVENTION

The present invention relates to a method and apparatus for preventing the formation of alkane hydrates in subsea oil and gas production equipment. More particularly, the invention relates to such a method and apparatus which relies on the use of a phase change material to maintain the produced well fluid above a predetermined temperature below which alkane hydrates will form.

Subsea oil and gas wells which are located at depths greater that 5,000 feet or at extreme latitudes are exposed to water which is typically just a few degrees above freezing. Although the well fluid is relatively hot as it flows through the subsea production equipment, the surrounding water will cool the fluid rapidly when the flow is interrupted for any length of time, such as by a temporary well shut down. If the well fluid is allowed to cool to below the hydrate formation temperature of the fluid, which averages about 70° F. for typical hydrocarbons, alkane hydrates may form in the fluid which may block the flow paths through the production equipment.

In the prior art, thermal insulation materials have been used on the subsea equipment to retard the cooling of the fluid until flow can be restored or a hydrate inhibitor can be injected into the fluid. However, several inches of insulation are usually required to provide the necessary thermal barrier, and this affects the design and manufacture of the subsea equipment and adds significantly to the cost of the equipment. In addition, the hydrate inhibitor and the equipment required to inject it into the fluid are relatively expensive.

SUMMARY OF THE INVENTION

These and other disadvantages in the prior art are overcome by the present inventive method of preventing the formation of alkane hydrates in a subsea oil and gas production equipment component having at least one flow path through which a well fluid is permitted to flow. The method comprises the steps of providing a phase change material which has a melting point below the normal flow temperature of the well fluid but above the hydrate formation temperature of the well fluid, and positioning the phase change material in heat exchange relation with respect to the flow path. Thus, when the well fluid cools and the temperature of the phase change material drops to its melting point, the phase change material will solidify and its latent heat will be transferred to the well fluid to maintain the temperature of the well fluid above the hydrate formation temperature. The present invention can therefore be seen to provide a passive method for maintaining the temperature of the well fluid above its hydrate formation temperature without the need for bulky insulation or costly hydration inhibitors.

In accordance with another aspect of the present invention, a temperature control device is provided for preventing the formation of alkane hydrates in a subsea oil and gas production equipment component having at least one flow path through which a well fluid is permitted to flow. The temperature control device comprises a housing which is positioned in heat exchange relation with respect to the flow path and a phase change material which is disposed in the housing. The phase change material has a melting point which is below the normal flow temperature of the well fluid but above the hydrate formation temperature of the well fluid. Thus, when the well fluid cools and the temperature of the phase change material drops to its melting point, the phase change material will solidify and its latent heat will be transferred to the well fluid to maintain the temperature of the well fluid above the hydrate formation temperature. In one embodiment of the invention, the housing comprises a flexible thermoplastic material and the temperature control device further comprises means for securing the housing in heat exchange relation with respect to the flow path. In another embodiment of the invention, the flow path is defined by a first conduit, the housing comprises a second, concentric conduit having a larger diameter than the first conduit and the phase change material is disposed between the first and second conduits. In accordance with yet another embodiment of the invention, the temperature control device also comprises a thermal insulation material disposed around the housing. Accordingly, the temperature control device effectively maintains the temperature of the well fluid above its hydrate formation temperature without the need for bulky insulation or costly hydration inhibitors.

These and other objects and advantages of the present invention will be made more apparent from the following detailed description, with reference to the accompanying drawings. In the drawings, the same reference numbers are used to denote similar components in the various embodiments.

BRIEF SUMMARY OF THE DRAWINGS

FIG. 1 is a partial perspective view of one embodiment of the temperature control device of the present invention shown installed on a subsea oil and gas production equipment component, with a portion of the housing of the device removed to show the phase change material disposed therein;

FIG. 2 is a partial, longitudinal cross sectional view of another embodiment of a temperature control device of the present invention shown installed on a subsea oil and gas production equipment component;

FIG. 3 is a radial cross sectional view of another embodiment of a temperature control device of the present invention shown installed on a subsea oil and gas production equipment component.

DETAILED DESCRIPTION OF THE PREFERRED EMBODIMENTS

Figure 4:
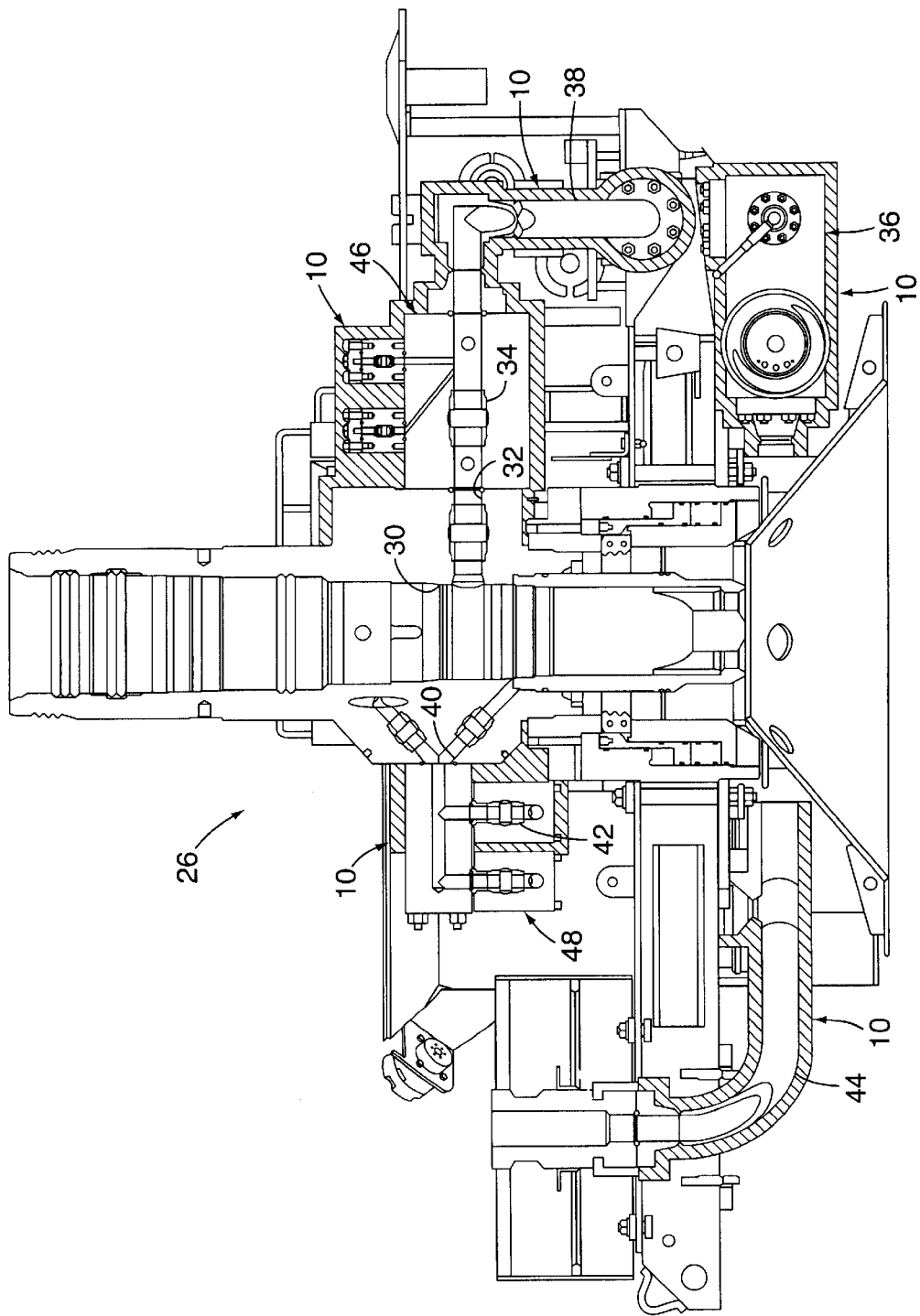
FIG. 4 is a cross sectional view of a subsea christmas tree having several components on which the temperature control device of the present invention is installed.

In accordance with the present invention, a phase change material is used in conjunction with a subsea oil and gas production equipment component to prevent the temperature of a well fluid flowing through the component from dropping below its hydrate formation temperature, that is, the temperature below which alkane hydrates will begin to form in the fluid. The average hydrate formation temperature for the common hydrocarbons that are produced through typical subsea wells is approximately 70° F. This temperature is several tens of degrees below the normal flow temperature of the well fluid, that is, the temperature of the well fluid as it flows through the production equipment. As used in this application, the term subsea oil and gas production equipment component is meant to include all the typical equipment which is used to produce oil or gas and through which such well fluids are permitted to flow during any phase of operation of the equipment. By way of example, such production equipment components can include wellheads, christmas trees, valves, flow control components, flow loops, flow lines, pipes, jumpers, manifolds, pipelines and risers. Also, in the context of the present invention, the phrase "preventing the formation of alkane hydrates" and similar phrases used herein should be interpreted to mean impeding the formation of alkane hydrates for a length of time which is greater than the time which would normally transpire before alkane hydrates would begin to form in the absence of the present invention.

Referring now to FIG. 1, the temperature control device of the present invention, which is indicated generally by reference number 10, is shown installed on a generally tubular subsea oil and gas production equipment component 12 having a flow path 14 through which a well fluid (not shown) is permitted to flow. Consistent with the above definition, the component 12 shown in FIG. 1 could be, for example, a flow loop, a flow line, a pipe, a jumper, a riser or a pipeline. In this embodiment of the invention, the temperature control device 10 is shown to comprise a phase change material 16 which is disposed in a housing 18 that is positioned in heat exchange relation with respect to the component 12. Therefore, the latent heat generated by the phase change material as is changes from the liquid to the solid state is readily conducted through the housing 18, to the component 12 and into the well fluid in the flow path 14.

The phase change material 16 is selected to comprise a melting point which is below the flow temperature of the well fluid but above the hydrate formation temperature of the fluid. Preferably, the melting point of the phase change material is about 5° F. above the hydrate formation temperature of the well fluid. During normal flow conditions of the production equipment, heat from the well fluid is transferred to the phase change material, and the temperature of the phase change material is therefore maintained near the flow temperature of the well fluid. Consequently, the phase change material is in the liquid state during normal flow conditions. In the event the flow of the well fluid is interrupted, for example by a temporary well shut down, the ambient water temperature will cool both the phase change material and the stagnant well fluid in the flow path 14. If the ambient water temperature is sufficiently low to cool the phase change material to its melting point, the phase change material will solidify. The latent heat generated by the phase change material during this change of state will be transferred to the well fluid in the component 12, and this heat will maintain the temperature of the fluid above its hydrate formation temperature for a length of time. The approximate amount of phase change material necessary to generate sufficient heat to maintain the temperature of the well fluid above its hydrate formation temperature for a desired length of time, for example the anticipated duration of a well shut down, can be determined based on the ambient water temperature, the flow temperature of the well fluid, the volume of well fluid in the component 12, the geometry of the component 12, the thermal conductivity of the housing 18 and the amount of latent heat generated by the phase change material 16. Suitable phase change materials for use in the present invention include hydrated salts, eutectic salts and paraffins. These and other phase change materials are available from a variety of sources, including Phase Change Laboratories, Inc. of San Diego, Calif.

The housing 18 is preferably constructed of a material which has good heat transfer characteristics and is sufficient to withstand the harsh conditions of the subsea environment. In the exemplary embodiment of the temperature control device 10 depicted in FIG. 1, the housing 18 is constructed of a thermoplastic sheet material which when assembled has a generally flat, rectangular configuration. During installation of the temperature control device 10, the housing 18, with the phase change material 16 preferably already contained therein, is wrapped around the component 12 and secured thereto by straps 20, an appropriate bonding agent, or any other suitable means. The housing 18 is preferably sufficiently large to cover substantially the entire component 12. However, several individual housings may be fitted over the component 12 and secured thereto in the event a single housing 18 is impractical for a given configuration of component 12. For example, several companies offer phase change materials which are prepackaged in flexible pouches having standard sizes, and combining several of these packages may be more convenient than custom configuring a single housing for the component 12. Alternatively, the housing 18 may be constructed of a rigid material which is designed to conform to the shape of the component 12 on which it will be installed and, if necessary, segmented into two or more sections to facilitate installation on the component. In accordance with another embodiment of the invention, the housing 18 may comprise a plurality of relatively small containers that are connected by a web of flexible material.

Another embodiment of the present invention is illustrated in FIG. 2. The temperature control device of this embodiment, which is indicated generally by reference number 100, is similar in many respects to the temperature control device 10 previously discussed. However, in the present embodiment the temperature control device 100 also comprises a cover 22 overlaying the housing 18. The cover 22 is preferably constructed of a waterproof thermal insulation material which can be molded or trowelled onto the housing 18, such as the type described in U.S. Patent Application No. 60/197,319, which is commonly owned herewith and which is hereby incorporated herein. Alternatively, the cover 22 may be constructed of a flexible sheet material which is wrapped around the housing 18 and secured thereto by any appropriate means. The cover 22 functions to seal and insulate the phase change material 16 and the housing 18 from the ambient environment and to slow the cooling of the phase change material and the well fluid in the component 12 in the event the flow is interrupted.

A further embodiment of the invention is shown in FIG. 3. In this embodiment of the temperature control device, which is indicated generally by reference number 200, the production equipment component 12 is a tubular conduit and the phase change material 16 is disposed in the annulus between the conduit 12 and a larger, concentric conduit 24. Thus, the housing for the phase change material is actually the two conduits 12, 24. Consequently, the phase change material 16 is in direct contact with the component 12, and this facilitates the transfer of heat from the phase change material to the well fluid in the flow path 14. If desired, the temperature control device may also include an insulating cover 22 overlaying the larger conduit 24.

The temperature control device of the present invention can be used to prevent the formation of alkane hydrates in many different components of a subsea oil and gas production equipment assembly. Referring to FIG. 4, several temperature control devices such as the temperature control device 10 are shown installed on several components of a subsea Christmas tree 26. The subsea christmas tree typically includes an axial production bore 30 in communication with the well bore, a production outlet 32 connected to the production bore, one or more production valves 34 for controlling flow through the production outlet 32, a choke 36 connected to the production outlet 32 via a flow loop 38, an annulus outlet 40 connected to the tubing annulus surrounding the production tubing (not shown), one or more annulus valves 42 for controlling flow through the annulus outlet 40, and a production flow loop 44 for connecting the production outlet with a subsea flow line (not shown). Ideally, the temperature control device 10 is applied to those portions of the christmas tree 26 which are most exposed to the surrounding seawater and through which the well fluid will flow. For example, in FIG. 4 the temperature control device 10 is shown applied to the production valve block 46 housing one or more of the production valves 34, the choke 36, the annulus valve block 48 housing one or more of the annulus valves 42, and the flow loops 38 and 44. Of course, the temperature control device 10 may be applied to additional or fewer components of the subsea christmas tree 26 as desired or required under particular circumstances.

As the exemplary embodiments of the device of the present invention demonstrate, the method of the present invention comprises positioning a phase change material in heat exchange relation with respect to a subsea oil and gas production equipment component having a flow path through which a well fluid is permitted to flow. The phase change material is selected to have a melting point below the flow temperature of the well fluid but above the hydrate formation temperature of the fluid. During normal operation of the production equipment, the temperature of the phase change material will be maintained near the flow temperature. In the event the flow of well fluid through the component is interrupted, the phase change material and the stagnant well fluid in the component will be cooled by the ambient water. If the temperature of the phase change material is reduced to its melting temperature, the phase change material will solidify and the latent heat generated by the phase change material during this change of state will be transferred to the well fluid to maintain the temperature of the well fluid above its hydrate formation temperature. An appropriate amount of phase change material is preferably used to generate sufficient heat to maintain the temperature of the well fluid above its hydrate formation temperature for a desired length of time.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

We claim:

1. A temperature control device for preventing the formation of alkane hydrates in a subsea oil and gas production equipment component having at least one flow path through which a well fluid is permitted to flow, the well fluid having a flow temperature and a lower hydrate formation temperature at which hydrates will form in the well fluid, the temperature control device comprising:

a housing positioned in heat exchange relation with respect to the component; and a phase change material disposed in the housing, the phase change material having a melting point which is below the flow temperature but above the hydrate formation temperature;

whereby when the temperature of the phase change material drops to its melting point, the phase change material will solidify and its latent heat will be transferred to the well fluid to maintain the temperature of the well fluid in the flow path above its hydrate formation temperature.

2. The device of claim 1, further comprising an insulating cover overlaying the housing.

3. The device of claim 1, wherein the housing is constructed of a flexible thermoplastic sheet material.

4. The device of claim 1, further comprising means for securing the housing to the component.

5. A method of preventing the formation of alkane hydrates in a subsea oil and gas production equipment component having at least one flow path through which a well fluid is permitted to flow, the well fluid having a flow temperature and a lower hydrate formation temperature at which hydrates will form in the well fluid, the method comprising the steps of:

providing a phase change material which has a melting point below the flow temperature but above the hydrate formation temperature; and positioning the phase change material in a housing which is disposed in heat exchange relation with respect to the component;

whereby when the temperature of the phase change material drops to its melting point, the phase change material will solidify and its latent heat will be transferred to the well fluid to maintain the temperature of the well fluid in the flow path above the hydrate formation temperature.

6. The method of claim 5, further comprising the step of insulating the phase change material from the ambient environment.

7. A subsea Christmas tree for producing a well fluid from a well bore, the well fluid having a flow temperature and a lower hydrate formation temperature at which hydrates will form in the well fluid, the christmas tree comprising:

a production bore in communication with the well bore;

a production outlet connected to the production bore;

at least one production equipment component having at least one flow path in communication with the production outlet and through which the well fluid is permitted to flow; and a a housing positioned in heat exchange relation with respect to the component; and a phase change material disposed in the housing, the phase change material having a melting point which is below the flow temperature but above the hydrate formation temperature;

whereby when the temperature of the phase change material drops to its melting point, the phase change material will solidify and its latent heat will be transferred to the well fluid to maintain the temperature of the well fluid in the flow path above its hydrate formation temperature.

8. The christmas tree of claim 7, further comprising an insulating cover overlaying the housing.

9. The Christmas tree of claim 7, wherein the housing is constructed of a flexible thermoplastic sheet material.

10. The christmas tree of claim 7, further comprising means for securing the housing to the component.

\* \* \* \* \*